(12) United States Patent
Dooley et al.

(10) Patent No.: US 8,063,158 B2
(45) Date of Patent: Nov. 22, 2011

(54) POLYMERIZATION PROCESS AND ASSOCIATED APPARATUS

(75) Inventors: Kenneth Alan Dooley, Longview, TX (US); Don Kent Farrer, Longview, TX (US); Sandra Dorothy Holyfield, Longview, TX (US); Tommy Ray Maddox, II, Smthfield, VA (US); Glenn Edward Moore, Longview, TX (US); Larry Allen Noble, Longview, TX (US)

(73) Assignee: Westlake Longview Corp., Houston, TX (US)

( * ) Notice: Subject to any disclaimer, the term of this patent is extended or adjusted under 35 U.S.C. 154(b) by 814 days.

(21) Appl. No.: 10/912,918

(22) Filed: Aug. 6, 2004

(65) Prior Publication Data

US 2005/0113545 A1    May 26, 2005

Related U.S. Application Data

(60) Provisional application No. 60/493,175, filed on Aug. 7, 2003.

(51) Int. Cl.
*C08F 2/00* (2006.01)
*C08F 210/00* (2006.01)
*B01J 19/18* (2006.01)
*B01J 8/18* (2006.01)

(52) U.S. Cl. ............ 526/64; 526/68; 526/348; 422/139; 422/132

(58) Field of Classification Search ................ 526/64, 526/68, 348; 422/139, 132
See application file for complete search history.

(56) References Cited

U.S. PATENT DOCUMENTS

| | | | |
|---|---|---|---|
| 3,790,550 A * | 2/1974 | Miller | 526/86 |
| 4,482,687 A | 11/1984 | Noshay et al. | |
| 4,588,790 A | 5/1986 | Jenkins, III et al. | |
| 4,877,587 A | 10/1989 | Rhee et al. | |
| 4,933,149 A | 6/1990 | Rhee et al. | |
| 5,028,669 A * | 7/1991 | Rowley et al. | 526/67 |
| 5,082,634 A | 1/1992 | Raufast | |
| 5,126,414 A | 6/1992 | Cooke et al. | |
| 5,213,768 A | 5/1993 | Maurel et al. | |
| 5,332,706 A * | 7/1994 | Nowlin et al. | 502/107 |
| 5,969,061 A | 10/1999 | Wonders et al. | |
| 6,472,482 B1 | 10/2002 | Evertz et al. | |
| 6,472,483 B1 * | 10/2002 | Goode et al. | 526/88 |

FOREIGN PATENT DOCUMENTS

| | | |
|---|---|---|
| EP | 0 337 365 | 10/1989 |
| EP | 0703246 B1 | 1/2002 |
| JP | 2001-062223 A | 3/2001 |
| WO | 9414856 | 7/1994 |
| WO | WO 95/11263 | 4/1995 |
| WO | WO 01/79306 A1 | 10/2001 |

* cited by examiner

*Primary Examiner* — William Cheung
(74) *Attorney, Agent, or Firm* — Phan Law Group PLLC

(57) ABSTRACT

There are disclosed polymerization processes and associated apparatuses. The polymerization processes involve both making a polymeric material in a fluidized bed reactor having a feed distributor and catching a spitwad with a spitwad catcher, and the apparatuses are those corresponding to such processes.

8 Claims, 1 Drawing Sheet

POLYMERIZATION PROCESS AND ASSOCIATED APPARATUS

CROSS REFERENCE TO RELATED APPLICATIONS

This application claims the benefit of U.S. provisional Application No. 60/493,175, filed Aug. 7, 2003, the entirety of which is hereby incorporated by Reference.

FIELD OF THE INVENTION

This invention relates to polymerization processes and associated apparatus.

More particularly, the invention relates to polymerization processes involving making a polymeric material in a fluidized bed reactor having a feed distributor and providing a spitwad catcher for collecting spitwads in or removing spitwads from a feed to the fluidized bed reactor and feed distributor. The invention also relates to an apparatus corresponding to such processes.

BACKGROUND OF THE INVENTION

Fluidized bed reactors (also referred to herein as the "reactor") are widely used in industry to make a variety of products such as polyethylene and other polyolefins. One problem often encountered in using these reactors is uneven channeling of a feed through the bed of the reactor resulting in partial or even total loss of bed fluidization; significant loss of fluidization may result in sheeting or agglomeration in the bed and/or make reactor shutdown necessary.

Channeling problems have been remedied by the use of feed distributors. U.S. Pat. Nos. 4,933,149; 5,082,634; and 5,213,768 are illustrative of feed distributors known in the art.

One drawback of such feed distributors is the tendency for them to plug with solids formed in or otherwise introduced into the reactor and/or recycle loop. Uneven channeling can then appear in the associated fluidized bed with consequences as previously described.

Attempts to solve these drawbacks are disclosed in the following patents. In U.S. Pat. No. 4,933,149, a deflector plate and screen located inside the polymerization reactor and below the feed distributor are disclosed in the Description by Rhee et al. In U.S. Pat. No. 5,082,634 Raufast discloses a method for removal of solids from above the feed distributor. In U.S. Pat. No. 5,126,414 Cooke et al. discloses a method of substantially eliminating distributor plate fouling by removing oligomers from the recycle feeds to the fluid bed reactor.

In spite of these attempts, there exists a need for better solutions to the aforementioned channeling and feed distributor plugging problems. The present invention is directed to filling this need among others.

SUMMARY OF THE INVENTION

The process according to the present invention relates to a polymerization process comprising: (a) making a polymeric material in a reactor loop comprising a fluidized bed reactor having a feed distributor, a recycle loop associated with the fluidized bed reactor and comprising a feed line; and (b) collecting a spitwad in or removing a spitwad from a feed to the fluidized bed reactor and the associated feed distributor with a spitwad catcher, wherein the spitwad catcher is located outside the fluidized bed reactor and in the feed line to the fluidized bed reactor and feed distributor.

This invention further relates to an apparatus for making a polymeric material comprising: (a) a reactor loop comprising a fluidized bed reactor having a feed distributor, a recycle loop associated with the fluidized bed reactor and comprising a feed line, and (b) a spitwad catcher for collecting a spitwad in or removing a spitwad from the feed, where the spitwad catcher is located outside the fluidized bed reactor and in the feed line to the fluidized bed reactor and feed distributor.

BRIEF DESCRIPTION OF THE DRAWING

The accompanying drawing, which is hereby incorporated in and constitutes a part of this specification, illustrates several embodiments of the invention and together with the description serve to explain the principles of the invention.

KEY TO NUMBER DESIGNATIONS IN FIG. 1

Figure 1:
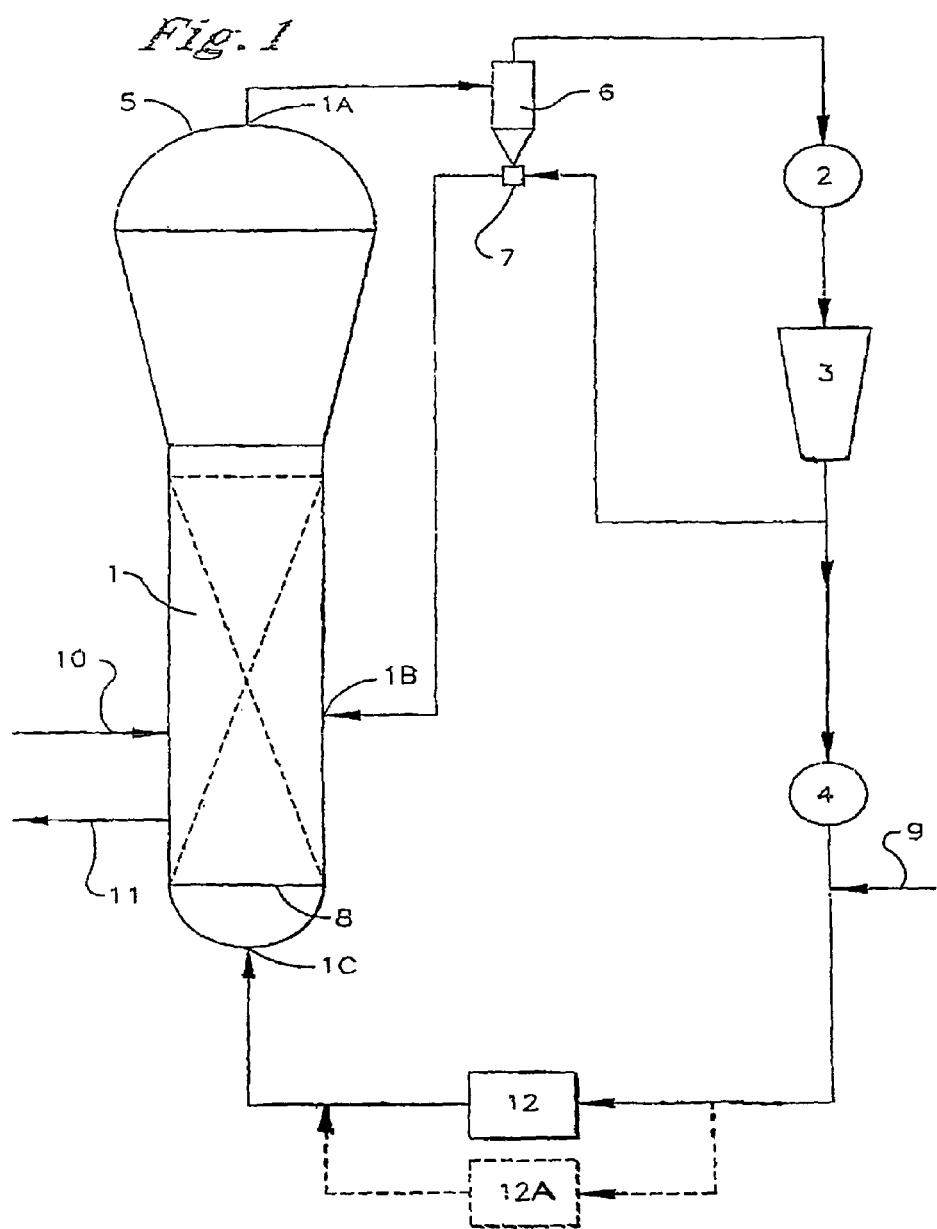
FIG. 1 shows embodiments of the processes and apparatus of the present invention.

1 Fluidized bed reactor
1A, 1B, 1C Boundaries of the cycle loop
2 Heat exchanger (optional)
3 Compressor
4 Heat exchanger (optional)
5 Enlarged disengaging zone
6 Fines cyclone (optional)
7 Fines return injector (optional)
8 Feed distributor
9 Fresh feed stream (combined)
10 Fresh catalyst injection
11 Product withdrawal
12 Spitwad catcher
12A Optional bypass spitwad catcher

DETAILED DESCRIPTION OF THE INVENTION

The processes according to the present invention are a polymerization process comprising: (a) making a polymeric material in a reactor loop comprising a fluidized bed reactor having a feed distributor, a recycle loop associated with the fluidized bed reactor and comprising a feed line; and (b) collecting spitwads in or removing spitwads from a feed to the fluidized bed reactor and the associated feed distributor with a spitwad catcher, wherein the spitwad catcher is located outside the fluidized bed reactor and in the feed line to the fluidized bed reactor and feed distributor.

In this specification and the claims that follow, polymeric and polymer should be understood to be broad enough to include oligomeric and oligomer with oligomeric and oligomer referring to materials that are at least trimeric or trimers. Recycle loop will be understood in its conventional sense, but will also include sections where recycle has been mixed with fresh feed or other materials, as in FIG. 1 from 9 to 1C.

In this specification and the claims that follow, a spitwad is a solid that can plug at least one aperture of the feed distributor. A spitwad as used herein, comprises of a solid polymeric material in a string, sheet, agglomerate, or other similar form. A spitwad is often formed and/or observed in polymerization fluidized bed reactors and associated feed recycle loops.

In this specification and the claims that follow, a spitwad catcher is any device that can collect spitwads in or remove spitwads from the feed to a fluidized bed reactor having an associated feed distributor, where the spitwads if not collected or removed would plug a portion of the feed distributor. For instance, spitwad catchers may be screens, filters, strainers or a combination of these. The spitwad catcher may be of any shape or size, such as flat, conical or basket shaped. The diameters of the perforations in spitwad catchers constructed from perforated materials can be of any size that substantially reduces the amount of spitwads that plug the feed distributor. The preferred diameters of the perforations or apertures in a spitwad catcher constructed from perforated materials range from about 75 to about 110% of the diameters of the apertures of the feed distributor. A more preferred range for the diameters of the perforations in a spitwad catcher constructed from perforated materials is from about 75 to about 95% of the diameters of the apertures of the feed distributor.

Spitwad catchers can also be cyclones or comprise a cyclone. Other types of spitwad catchers include other gas-solid separators such as knockout drums or tanks and the like.

A spitwad catcher involved in the processes according to the present invention is located outside the reactor and in the feed line to the fluidized bed reactor and associated feed distributor. In this specification and the claims that follow, the feed line refers to the portion of the recycle loop that has no intervening piece of process equipment, such as a heat exchanger or compressor, in the flow line before entering the fluidized bed reactor and associated feed distributor. A feed line also includes a by-pass line, such as illustrated by by-pass line 16. Referring specifically to FIG. 1, the feed line to the fluidized bed reactor and associated feed distributor is the part of the recycle loop that is after the compressor 3 and before the fluidized bed reactor 1 and feed distributor 8 in FIG. 1. If the optional heat exchanger 4 in FIG. 1 is present, then the feed line to the fluidized bed reactor 1 and feed distributor 8 is the part of the recycle loop that is after the optional heat exchanger 4 and before the fluidized bed reactor 1 and feed distributor 8. For instance, in FIG. 1, a spitwad catcher 12 is located between the heat exchanger 4 and the fluidized bed reactor 1.

A recycle loop is the part of the polymerization process where the unreacted gases (and/or other materials leaving the fluidized bed reactor) leave the fluidized bed reactor and are returned as feed back into the fluidized bed reactor. In the present invention, a reactor loop is comprised of the recycle loop and the fluidized bed reactor. An example of a recycle loop in the processes according the present invention is shown in FIG. 1 between points 1A, where unreacted gases leave the fluidized bed reactor, to points 1B and 1C, where the recycled gases are fed back into the fluidized bed reactor.

The processes of the present invention include those described herein where the fluidized bed reactor is a continuous, gas phase polymerization reactor with some more specific examples including such reactors in which polymeric materials comprising polyolefin(s) are made, especially (at least in part) homopolymers or interpolymers of alpha olefins such as polyethylene, polypropylene and interpolymers of ethylene or propylene and at least one other olefin (such as one or more olefins containing 3 to 16 carbon atoms). Included herein are homopolymers of ethylene or propylene and interpolymers of ethylene or propylene and other olefin(s). The interpolymers include interpolymers of ethylene or propylene and at least one other olefin(s) wherein the ethylene or propylene content is at least about 50% by weight of the total monomers involved; exemplary other olefins that may be utilized are ethylene, propylene, 1-butene, 1-pentene, 1-hexene, 1-heptene, 1-octene, 4-methyl-1-pentene, 1-decene, 1-dodecene, 1-hexadecene and the like. Also utilizable herein are non-conjugated dienes and olefins formed in situ in the polymerization medium.

The processes of the present invention include those corresponding to the apparatus of the present invention and vice versa.

The present invention further relates to an apparatus for making a polymeric material comprising: (a) a reactor loop comprising a fluidized bed reactor having a feed distributor, a recycle loop associated with the fluidized bed reactor and comprising a feed line, and (b) a spitwad catcher for collecting spitwads in or removing spitwads from the feed, where the spitwad catcher is located outside the fluidized bed reactor and in the feed line to the fluidized bed reactor having a feed distributor.

The apparatus of the present invention include those described herein wherein the fluidized bed reactor is a continuous gas phase reactor with some more specific examples being those for making polymeric materials comprising polyolefin(s), especially (at least in part) homopolymers or interpolymers of alpha olefins such as polyethylene, polypropylene and interpolymers of ethylene or propylene and at least one other olefin (such as one or more olefins containing 3 to 16 carbon atoms). Included herein are homopolymers of ethylene or propylene and interpolymers of ethylene or propylene and other olefin(s). The interpolymers include interpolymers of ethylene or propylene and at least one other olefin(s) wherein the ethylene or propylene content is at least about 50% by weight of the total monomers involved; exemplary other olefins that may be utilized are ethylene, propylene, 1-butene, 1-pentene, 1-hexene, 1-heptene, 1-octene, 4-methyl-1-pentene, 1-decene, 1-dodecene, 1-hexadecene and the like. Also utilizable herein are non-conjugated dienes and olefins formed in situ in the polymerization medium.

The apparatuses of the present invention include those described herein that comprise more than one spitwad catcher located in the recycle loop.

A further embodiment of this invention comprises a removable spitwad catcher that can be taken out of service while the polymerization process continues to operate. In a preferred embodiment the apparatus of the present invention includes those described herein further comprising a bypass line (also considered a feed line) around the spitwad catcher and optionally another spitwad catcher in such a bypass line.

It may also be advantageous for a spitwad catcher to be equipped for removal of spitwads from the spitwad catcher while the spitwad catcher is still in service and the polymerization process continues to operate. Thus the apparatus of the present invention includes those wherein the spitwad catcher is equipped for removal of captured spitwads from the spitwad catcher while the spitwad catcher is in service.

Elements in a reactor loop for a preferred polyethylene process are illustrated in FIG. 1 and include the reactor vessel 1 and the recycle loop (having the boundaries from 1A to 1B or 1C). The recycle loop is comprised of optional heat exchangers 2 and 4, compressor 3, optional fines cyclone 6, optional fines return injector 7, spitwad catcher 12, and optional spitwad catcher 12A. It is preferred to have at least one heat exchanger in the recycle loop. A feed distributor 8 is provided near the bottom of the reactor. An enlarged disengaging zone 5 is provided near the top of the reaction vessel for reducing entrainment of solids in the exiting gas. Various schemes are used to replenishing the ethylene, comonomer, hydrogen, and inerts in the main gas recycle system. These are depicted in FIG. 1 as a single combined stream 9 for simplicity. Catalyst injection, in the form of prepolymer, is shown by stream 10, and polymer powder discharge is shown as stream 11.

EXAMPLES

This invention can be further illustrated by the following examples. It will be understood that these examples are included for purposes of illustration and are not intended to limit the scope of the invention unless otherwise specifically indicated. Titles given for the examples are for convenience and are not meant as scope limiting, unless specifically noted otherwise.

General Set-Up for the Examples

The transition metal component of the Ziegler-Natta catalyst used in Examples 1-7 herein was prepared in accordance with Example 1-a of European Patent Application EP 0 703 246 A1. The Ziegler-Natta catalyst was used in prepolymer form, and was prepared in accordance with Example 1-b of European Patent Application EP 0 703 246 A1. A prepolymer containing about 35.7 grams of polyethylene per millimole of titanium, with a tri-n-octylaluminum (TnOA) to titanium molar ratio of about 1.0, was thus obtained.

The continuous, gas-phase polymerization process utilized in Examples 1-7 herein was carried out in a fluidized bed reactor for gas phase polymerization, consisting of a vertical cylinder of diameter 5 meters and height 16 meters and surmounted by a velocity reduction chamber. The reactor was provided in its lower part with a feed distributor. The reactor was also provided with an external line for recycling gas, which connects the top of the velocity reduction chamber to the lower part of the reactor, at a point below the feed distributor. In this way, the recycling gas is the feed to the polymerization reactor and to the feed distributor. The recycle loop was equipped with a compressor (with a protection screen) for circulating gas and a heat exchanger. In particular, the lines for supplying fresh ethylene, 1-hexene, hydrogen and nitrogen (and the usual trace impurities), which represent the main constituents of the gaseous reaction mixture passing through the fluidized bed, feed into the recycling line. After the compressor and the heat exchanger, the gas recycling line was divided into two separate lines that then were used to introduce the recycling gas beneath the feed distributor at two points directly opposite one another. The arrangement of the reactor entries for the recycling gas and the design of the gas mixing chamber below the feed distributor are described in U.S. Pat. No. 5,213,768.

The feed distributor is designed to distribute the fluidization gas approximately evenly across the diameter of the fluid bed reactor. The design of the feed distributor is described in U.S. Pat. No. 5,082,634. The feed distributor is provided with apertures and the gas stream introduced beneath the feed distributor is distributed more or less evenly through these apertures.

Above the feed distributor, the reactor contained a fluidized bed made up of about 80,000 to 100,000 kilograms (after reactor lined out) of a linear low-density polyethylene powder (an interploymer of ethylene and 1-hexene) made up of particles with a weight-average diameter of about 0.7 mm. The gaseous reaction mixture, which contained ethylene, 1-hexene, hydrogen and nitrogen, passed through the fluidized bed under a pressure ranging from about 290 psig (2.0 MPa) to about 305 psig (2.2 MPa) with an ascending fluidization velocity of between about 1.7 feet per second (52 cm per second) and about 1.95 feet per second (59 cm per second). Polymer product was removed intermittently from the reactor.

Catalyst was introduced intermittently into the reactor, the catalyst comprising magnesium, chlorine and titanium and having been converted beforehand to a prepolymer, as described above, containing about 35.7 grams of polyethylene per millimole of titanium and an amount of tri-n-octylaluminum (TnOA) such that the molar ratio, TnOA/Ti, was equal to about 1.0. The rate of introduction of the prepolymer form catalyst into the reactor was adjusted to achieve the desired production rate. During the polymerization, a solution of trimethylaluminum (TMA) in n-hexane, at a concentration of about 45 weight percent, was introduced continuously into the recycle loop. The feed rate of TMA is expressed as a molar ratio of TMA to titanium (TMA/Ti), and is defined as the ratio of the TMA feed rate (in moles of TMA per hour) to the prepolymer form catalyst feed rate (in moles of titanium per hour). Simultaneously, a solution of tetrahydrofuran (THF) in n-hexane, at a concentration of between 10 and 50 weight percent, was introduced continuously into the line for recycle loop. The feed rate of THF is expressed as a molar ratio of THF to titanium (THF/Ti), and is defined as the ratio of the THF feed rate (in moles of THF per hour) to the prepolymer form catalyst feed rate (in moles of titanium per hour). Dinitrogen monoxide ($N_2O$) was added as a gas into the recycle loop. The flow of $N_2O$ was adjusted to maintain the concentration of $N_2O$ in the gas phase polymerization medium at about 350 parts per million (ppm) by volume.

A solution of chloroform ($CHCl_3$) in n-hexane, at a concentration of between 2 and 30 weight percent, was introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer form catalyst feed rate (in moles of titanium per hour). The $CHCl_3$ was added as a solution in n-hexane to the recycle loop.

Example 1

55-Day Run Without a Spitwad Catcher
(Comparative)

A continuous, gas-phase polymerization process was operated according to the general setup given above. After about 55 days, the pressure drop across the feed distributor had increased to a point that indicated significant fouling of the feed distributor. At the same time other components of the recycle loop had also fouled and together were restricting gas flow such that a maximum fluidization velocity of about 1.6 feet per second was all that could be achieved in the reactor. At these conditions, the bed began exhibiting unstable behavior and had to be shut down. Visual inspection of the feed distributor revealed that approximately 35% of the apertures in the feed distributor had plugged with spitwads that were larger than the apertures in the feed distributor. Plugging of the feed distributor with these spitwads had occurred from the feed side of the feed distributor. With the reactor shut down, spitwads were removed from the feed distributor, resulting in a lengthy shut down period.

Example 2

39-Day Run Without a Spitwad Catcher
(Comparative)

A continuous, gas-phase polymerization process was operated according to the general setup given above. After about 39 days, the pressure drop across the feed distributor had increased to a point that indicated significant fouling of the feed distributor. At the same time other components of the recycle loop had also fouled and together were restricting gas flow such that a maximum fluidization velocity of about 1.55 feet per second was all that could be achieved in the reactor. At these conditions, the bed began exhibiting unstable behavior and had to be shut down. Visual inspection of the feed distributor revealed that approximately 25% of the apertures in the feed distributor had plugged with spitwads that were larger than the apertures in the feed distributor. Plugging of the feed distributor with these spitwads had occurred from the feed side of the feed distributor. With the reactor shut down, spitwads were removed from the feed distributor, resulting in a lengthy shut down period.

Example 3

4-Day Run Without a Spitwad Catcher
(Comparative)

A continuous, gas-phase polymerization process was operated according to the general setup given above. After about 4 days, the pressure drop across the feed distributor had increased to a point that indicated significant fouling of the feed distributor. At these conditions, the bed began exhibiting unstable behavior and had to be shut down. Visual inspection of the feed distributor revealed that approximately 45% of the apertures in the feed distributor had plugged with spitwads that were larger than the apertures in the feed distributor. Plugging of the feed distributor with these spitwads had occurred from the feed side of the feed distributor. With the reactor shut down, spitwads were removed from the feed distributor; a shut down period of 137 hours was required to perform this work.

Example 4

5-Day Run Without a Spitwad Catcher
(Comparative)

A continuous, gas-phase polymerization process was operated according to the general setup given above. After about 5 days, the pressure drop across the feed distributor had increased to a point that indicated significant fouling of the feed distributor. At these conditions, the bed began exhibiting unstable behavior and had to be shut down. Visual inspection of the feed distributor revealed that approximately 30% of the apertures in the feed distributor had plugged with spitwads that were larger than the apertures in the feed distributor. Plugging of the feed distributor with these spitwads had occurred from the feed side of the feed distributor. With the reactor shut down, spitwads were removed from the feed distributor; a shut down period of 60 hours was required to perform this work.

Example 5

10-Day Run Without a Spitwad Catcher
(Comparative)

A continuous, gas-phase polymerization process was operated according to the general setup given above. After about 10 days, the pressure drop across the feed distributor had increased to a point that indicated significant fouling of the feed distributor. At these conditions, the bed began exhibiting unstable behavior and had to be shut down. Visual inspection of the feed distributor revealed that approximately 25% of the apertures in the feed distributor had plugged with spitwads that were larger than the apertures in the feed distributor. Plugging of the feed distributor with these spitwads had occurred from the feed side of the feed distributor. With the reactor shut down, spitwads were removed from the feed distributor; a shut down period of 70 hours was required to perform this work.

Example 6

90-Day Run With Spitwad Catchers

Each of the two 23 inch inside diameter gas recycle loop lines feeding the polymerization reactor were fitted with baskets constructed from 0.078 inch thick carbon steel perforated plate having 0.1875 inch diameter perforations on staggered, 0.25 inch centers. The baskets were fitted into two sections of pipe (one basket per line) that were about 99.5 inches long and that were used to connect the reactor inlet piping flanges to piping flanges on each of the two gas recycle lines. Flanges constructed from ⅛ inch thick, steel plate were welded to the inlet end of the baskets. When the baskets were inserted into the 2 piping spools, the steel flanges on the baskets were fitted, with appropriate sealing gaskets, between the piping flanges that are connected when the spool were put in service. The baskets were constructed in the shape of a truncated cone having an outside diameter at the inlet of the baskets of 22.375 inches and a diameter at the gas exit end of the basket of 13.75 inches. The baskets were 85 inches in length. The mechanical integrity of the baskets were improved by welding ⅛ inch thick steel stiffening rings and lateral supports to the outside of the basket and additional lateral supports constructed from ⅜ inch steel angle iron to the inside of the baskets. The discharge end of each basket was attached to four, equally spaced brackets that had been welded to the inside of the about 99.5 inch long spools at the end of the basket from which the recycling gas exits. Thus, a means was provided for separating polymer spitwads from the recycling gas upstream of the feed distributor.

The continuous, gas-phase polymerization process was operated according to the general set up given above for a period of 90 days with the baskets (spitwad catchers) described here installed in the feed lines to the reactor and feed distributor. After 90 days, the pressure drop across the feed distributor had not increased significantly, indicating that the feed distributor had not fouled significantly.

Example 7

Inspection of Internals after Run With Spitwad Catchers

The continuous, gas-phase polymerization process according to the general set up given above and with baskets (spitwad catchers) installed as in Example 6 was operated for a period of 2 days. After 2 days, the pressure drop across the feed distributor had not increased significantly while the pressure drop across each of the spitwad catchers had increased approximately 4 pounds per square inch. Though there was no sign of bed instability and fluidization velocity could be maintained above 1.8 feet per second, the process was shut down to check the feed distributor and the baskets. Inspection of the feed distributor indicated that it had not fouled at all. Inspection of the baskets showed that they had collected approximately 100 lbs of polymer spitwads each and that the spitwads that had been collected had covered approximately 65% of the surface area of the baskets. This was estimated to be enough material to plug the 50% of the aperatures in the feed distributor more than 8 times. The process of cleaning the baskets required the reactor to be shut down for about 33 hours. The feed distributor did not require cleaning.

References cited herein are hereby incorporated by reference for the purposes for which they are cited here, but only to the extent that they do not contradict the disclosures herein.

Ranges given herein are understood to disclosure all values subsumed (including the range endpoints) and not merely the range endpoints alone.

The specific embodiments of the present invention given previously are intended as illustrative and should not be interpreted as limiting the claims unless specifically indicated otherwise.

That which is claimed is:

1. A polymerization process comprising:
   (a) making a polymeric material in a fluidized bed reactor, which comprises a feed distributor located near the bottom of the reactor and an enlarged disengaging zone located near the top of the reactor;
   (b) passing unreacted gases leaving the fluidized bed reactor to a recycle loop, which connects the enlarged disengaging zone to a part of the reactor below the feed distributor; and
   (c) collecting spitwads in or removing spitwads from the recycle loop with a spitwad catcher,
   wherein a spitwad is a solid that would plug at least one aperture of the feed distributor if not collected or removed, and
   wherein the spitwad catcher is located in a portion of the recycle loop that has no intervening piece of process equipment before entering the fluidized bed reactor.

2. The polymerization process of claim 1, wherein the fluidized bed reactor is a continuous, gas phase reactor.

3. The polymerization process of claim 1, wherein the polymeric material comprises a polyolefin.

4. The polymerization process of claim 1, wherein the polymeric material comprises a homopolymer of ethylene or an interpolymer of ethylene and at least one other olefin.

5. The polymerization process of claim 1, wherein the spitwad catcher comprises a screen, filter, or strainer.

6. The polymerization process of claim 1, wherein the spitwad is in the form of a string, sheet, or agglomerate.

7. The polymerization process of claim 1, wherein the recycle loop comprises a by-pass line around the spitwad catcher.

8. The polymerization process of claim 7, wherein the by-pass line comprises another spitwad catcher.

* * * * *